(12) United States Patent
Takahashi (10) Patent No.: US 9,335,228 B2
(45) Date of Patent: May 10, 2016

(54) DYNAMOMETER SYSTEM CONTROL DEVICE

(71) Applicant: MEIDENSHA CORPORATION, Tokyo (JP)

(72) Inventor: Toshimichi Takahashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 14/404,352

(22) PCT Filed: May 28, 2013

(86) PCT No.: PCT/JP2013/064771
§ 371 (c)(1),
(2) Date: Nov. 26, 2014

(87) PCT Pub. No.: WO2013/180130
PCT Pub. Date: Dec. 5, 2013

(65) Prior Publication Data
US 2015/0219510 A1    Aug. 6, 2015

(30) Foreign Application Priority Data

May 29, 2012  (JP) .................................. 2012-122378

(51) Int. Cl.
*G01L 3/22* (2006.01)
(52) U.S. Cl.
CPC ........................................ *G01L 3/22* (2013.01)
(58) Field of Classification Search
CPC .................................... G01L 3/16; G01L 3/22
See application file for complete search history.

(56) References Cited

U.S. PATENT DOCUMENTS

| 4,257,261 A | * | 3/1981 | Ono | ........................ | G01L 3/22 |
| | | | | | 73/862.18 |
| 4,963,804 A | * | 10/1990 | Geiger | .................. | G05D 19/02 |
| | | | | | 310/51 |

FOREIGN PATENT DOCUMENTS

| JP | 01-138836 | 5/1989 |
| JP | 2798217 B2 | 9/1998 |
| JP | 2006-184135 | 7/2006 |
| JP | 2008-070119 A | 3/2008 |
| JP | 2010-019652 A | 1/2010 |
| JP | 2011-161987 A | 8/2011 |
| JP | 58-090135 | 5/2013 |

* cited by examiner

*Primary Examiner* — Mischita Henson
(74) *Attorney, Agent, or Firm* — Muncy, Geissler, Olds & Lowe, P.C.

(57) ABSTRACT

Provided is a dynamometer system control device capable of stable and highly responsive control. This dynamometer system control device is provided with a torque control device which outputs a torque command signal on the basis of an output signal (LC_det) of a load cell, and with a characteristic vibration suppression circuit which corrects the torque command signal to suppress the characteristic vibration of an oscillator and which inputs said signal to an inverter as a control input signal. The circuit is provided with a differential compensator which performs a differentiation operation on a load cell approximation signal (Pmdl_det) calculated using an approximation equation in a secondary delay canonical form in a vibration output calculation unit, and with a subtractor which corrects the torque command signal by subtracting the output signal from the compensator from the torque command signal (Tdy_ref).

7 Claims, 6 Drawing Sheets

DYNAMOMETER SYSTEM CONTROL DEVICE

TECHNICAL FIELD

The present invention relates to a control device for a dynamometer system.

BACKGROUND ART

In an engine dynamometer system and/or a chassis dynamometer system, which carry a rocking type dynamometer, a load cell is used as a sensor for detecting torque for the control and measurement of the system. The load cell detects torque acting on a rocking piece of the dynamometer, through a torque arm extending from the rocking piece (see Patent Document 1). In such a structure, in addition to torque which should be actually detected by the dynamometer, a torque fluctuation component is superimposed on an output signal from the load cell, due to natural vibration of the rocking piece; and this fluctuation component is fundamentally unnecessary for the control and measurement of the system. Accordingly, there has been conventionally proposed a technique for eliminating an unnecessary torque fluctuation component from an output signal from a load cell (see Patent Documents 1 and 2).

In the technique as disclosed in Patent Documents 1 and 2, an acceleration' sensor is provided to a rocking piece and a torque arm, separately from a load cell; and an output signal from the acceleration sensor and an output signal from the load cell are composited through predetermined procedures, thereby eliminating fluctuation due to natural vibration of the rocking piece from the output signal from the load cell.

Patent Document 1: Japanese Unexamined Patent Application, Publication No. 2006-184135
Patent Document 2: Japanese Unexamined Patent Application, Publication No. S58-90135
Patent Document 3: Japanese Unexamined Patent Application, Publication No. H1-138836

DISCLOSURE OF THE INVENTION

Problems to be Solved by the Invention

As described above, in a conventional system provided with a rocking type dynamometer, a fluctuation component included in an output signal from a load cell is often eliminated as noise due to natural vibration of a rocking piece. However, the conventional system does not intend to suppress the natural vibration per se of the rocking piece; therefore, when the control responsiveness in particular is attempted to be enhanced, resonance due to this natural vibration may cause an unstable phenomenon such as electrode hunting or divergence. Therefore, highly responsive and stable control is difficult in the conventional rocking type dynamometer system.

An object of the present invention is to provide a control device for a dynamometer system, which is capable of highly responsive and stable control.

Means for Solving the Problems

In order to achieve the above-mentioned object, a first aspect of the present invention provides a control device (for example, control devices 5, 5A, 5B, 5C, 5D to be described later) for a dynamometer system (for example, a dynamometer system 1 to be described later), which is provided with: a rocking type dynamometer (for example, a dynamometer 2 to be described later) connected to a load; an inverter (for example, an inverter 3 to be described later) for supplying electric power to the dynamometer; and a load cell (for example, a load cell 26 to be described later) for detecting torque generated in a rocking piece of the dynamometer, through a torque arm (for example, a torque arm 27 to be described later) extending from the rocking piece. The control device is provided with: a main control device (for example, a torque control device 6 to be describe later) for outputting a main signal (Tdy_ref), based on an output signal from the load cell; and a natural-vibration suppression means (for example, a natural-vibration suppression circuit 7 to be described later) for correcting the main signal so as to suppress a natural vibration of the rocking piece, and for inputting the main signal as a control input signal (Tdy_ref') into the inverter. The natural-vibration suppression means is characterized by including: a differential compensator (for example, a differential compensator 71 to be described later) for performing differential calculation on the output signal (LC_det) from the load cell or an approximation signal (Pmdl_det) of the load cell, which is calculated by using a predetermined approximation equation; and a subtractor (for example, a subtractor 72 to be described later) for correcting the main signal by subtracting an output signal of the differential compensator from the main signal.

In a dynamometer provided with a rocking piece, a transfer function from inputting into an inverter to outputting from a load cell is approximately represented by a secondary delay canonical form; however, according to the present invention, a control input signal into such a controlled object is corrected by the differential compensator, and as a result, damping can be provided to the controlled object so as to suppress the natural vibration of the rocking piece. The control device of the present invention is provided with the natural-vibration suppression means including such a differential compensator; and as a result, the natural vibration per se of the rocking piece can be suppressed, and eventually, unnecessary torque fluctuation components can be eliminated from the output signal from the load cell. Therefore, according to the present invention, a stable output signal can be obtained from a load cell, without providing a conventionally-required acceleration sensor to a mechanical device. Such a natural-vibration suppression means suppresses the natural vibration of the rocking piece; and as a result, the main control device can control the dynamometer in a stable and highly responsive manner.

In a second aspect of the present invention, it is preferable that the control device is further provided with: a vibration output calculation unit (for example, a vibration output calculation unit 81A to be described later) for outputting the approximation signal, based on an approximation equation for characterizing inputting to the inverter to outputting from the load cell by a predetermined damping coefficient and a natural vibration frequency of the rocking piece, by using as an input, a sum of a control input signal to be input into the inverter or a signal proportional thereto, and a predetermined feedback signal; a delay compensator (for example, a delay compensator 82A, 82B to be described later) including a dead-time delay element (for example, $e^{-L_{mdl} \cdot s}$ to be described later) for delaying the approximation signal by a predetermined dead time; and a deviation compensator (for example, a deviation compensator 83A to be described later) for outputting the feedback signal to the vibration output calculation unit, so as to minimize a deviation (err) between the output signal (LCmcl_det) from the delay compensator and the output signal (LC_det) from the load cell; in which the differential compensator preferably uses, as an input, the approximation signal that is input into the delay compensator.

In relation to the second aspect, various delays are included in a system associated with inputting into an inverter to outputting from a load cell. According to the present invention, the vibration output calculation unit is provided for outputting an approximation signal, based on an approximation equation characterized by a natural vibration frequency of the rocking piece and a damping coefficient; and in addition, the delay compensator and the deviation compensator perform phase lead compensation on an approximation signal by a predetermined dead time, and the approximation signal is input into the differential compensator; therefore, the natural vibration of the rocking piece can be reliably suppressed, while reducing the influence of disturbance and delay.

In a third aspect of the present invention, it is preferable that the delay compensator is configured by connecting the dead-time delay element (for example, $e^{-Lmdl \cdot s}$ to be described later) with the lowpass filter element (for example, $P_{F\_mdl}(s)$ to be described later) for removing noise from the approximation signal.

In relation to the third aspect, a filter for removing noise in a high frequency domain may be provided to a system associated with inputting into an inverter to outputting from a load cell. According to the present invention, the delay compensator is configured by connecting the dead-time delay element with the lowpass filter element; and as a result, phase lead compensation corresponding to the dead time, and compensation for detection characteristics of the actual load cell, are performed on the approximation signal, which can be input into the differential compensator. As a result, the natural vibration of the rocking piece can be more reliably suppressed.

In a fourth aspect of the present invention, it is preferable that the control device is further provided with: a proportional element (for example, a proportional element 84C to be described later) for multiplying a control input signal, which is input into the inverter, by a predetermined coefficient; and an adder (for example, an adder 85C to be described later) for inputting a sum of an output signal from the proportional element and the feedback signal, into the vibration output calculation unit.

In relation to the fourth aspect, in a system associated with inputting into an inverter to outputting from a load cell, a control input signal multiplied by a predetermined coefficient may be input into the inverter, in order to correct a direct current gain characteristic to an appropriate characteristic. According to the present invention, a control input signal which is input into the inverter is multiplied by a predetermined coefficient, and a sum of the multiplied signal and the feedback signal is input into the vibration output calculation unit; therefore, an approximation signal in consideration of correction of the direct current gain characteristic can be input into the differential compensator. As a result, the natural vibration of the rocking piece can be more reliably suppressed.

In a fifth aspect of the present invention, it is preferable that the approximation equation is defined by following transfer function $P_{mdl}(s)$, where $\omega n$ represents a natural vibration frequency of the rocking piece, $\zeta$ represents a damping coefficient, and s represents a Laplace operator; and the transfer function of the differential compensator is defined by following transfer function $H_{LPF}(s)$ having a pseudo-differential characteristic, where K represents an arbitrary constant that is larger than 0 and smaller than 1, and $1/G_{LPF}(s)$ represents an arbitrary transfer function with a relative degree of at least 1.

$$P_{mdl}(s) = \frac{\omega n^2}{s^2 + 2 \cdot \zeta \cdot \omega n \cdot s + \omega n^2} \quad (1\text{-}1)$$

$$H_{LPF}(s) = \frac{2 \cdot K \cdot s}{\omega n} \cdot \frac{1}{G_{LPF}(s)} \quad (1\text{-}2)$$

In the fifth aspect, a closed loop transfer function G(s) of a system configured through feedback connection of $P_{mdl}(s)$ with $H_{LPF}(s)$ is expressed by the following Equation (2), in which $1/G_{LPF}(s)$ is approximated at 1, which is introduced for the purpose of reducing detection noise in a high frequency domain. Therefore, according to the present invention, by adjusting the level of the coefficient k of the differential compensator, a preferred frequency response characteristic can be easily realized, so as to suppress a resonance point in the natural vibration frequency.

$$G(s) = \frac{\omega n^2}{s^2 + 2 \cdot (\zeta + K) \cdot \omega n \cdot s + \omega n^2} \quad (2)$$

Effects of the Invention

According to the present invention, a stable output signal can be obtained from a load cell, without providing an acceleration sensor to a mechanical device. Such a natural-vibration suppression means suppresses the natural vibration of the rocking piece; and as a result, the main control device can control the dynamometer in a stable and highly responsive manner.

EXPLANATION OF REFERENCE NUMERALS

1 . . . dynamometer system
2 . . . dynamometer
23 . . . rocking piece
26 . . . load cell
27 . . . torque arm
3 . . . inverter
5, 5A, 5B, 5C, 5D . . . control device
6 . . . torque control device (main control device)
7 . . . natural-vibration suppression circuit (natural-vibration suppression means)
71 . . . differential compensator 72 ... subtractor
8A, 8B, 8C, 8D ... observer calculation unit
81A ... vibration output calculation unit
82A, 82B ... delay compensator
83A ... deviation compensator
84C ... proportional element
85C ... adder

PREFERRED MODE FOR CARRYING OUT THE INVENTION

Preferred embodiments of the present invention will hereinafter be described with reference to the attached drawings.

Figure 1:
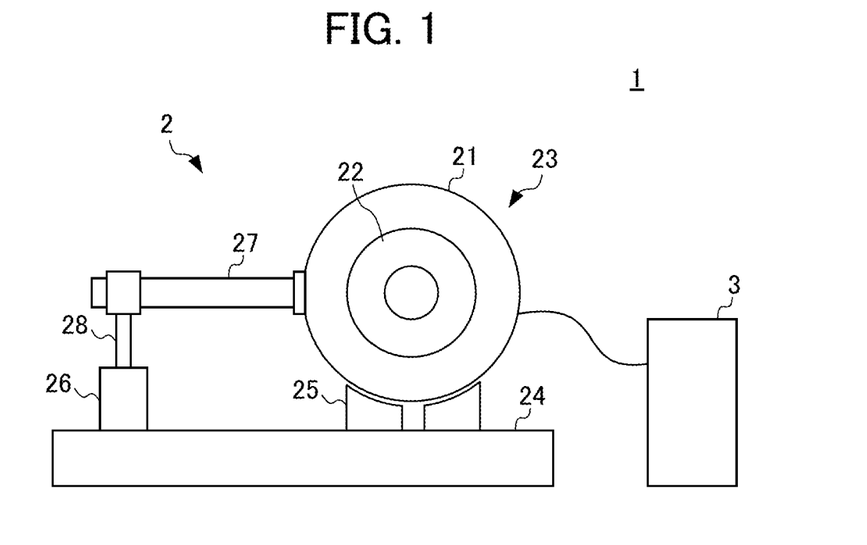
FIG. 1 is a diagram schematically showing a configuration of a dynamometer system according to an embodiment of the present invention.

FIG. 1 is a diagram schematically showing a configuration of a rocking type dynamometer system 1.

The system 1 is configured by including: a rocking piece dynamometer 2; an inverter 3 which supplies electric power to the dynamometer 2 in accordance with a torque current command signal; and a control device thereof (not shown).

The dynamometer 2 is provided with: a cylindrical stator 21; a rotator 22 which is rotatably supported by the stator 21; a pedestal 25 for rockingly supporting a rocking piece 23 on a base 24, the rocking piece 23 being composed of the stator 21 and the rotator 22; and a load cell 26 for detecting torque generated in the rocking piece 23.

A load (not shown) is connected to a rotational axis of the rotator 22. The rocking piece 23 is provided with a torque arm 27, which substantially horizontally extends. The load cell 26 is provided on the base 24. The torque arm 27 is connected to the load cell 26 through a joint member 28 provided at a tip of the torque arm 27. When a driving force is transmitted from the load to the rotational axis, torque is generated in the rotator 22, and as a counteraction thereof, torque is generated in the stator 21. The torque generated in the rocking piece 23 is detected by the load cell 26 through the torque arm 27 and the joint member 28.

Configurations of the control device for the dynamometer system 1 including the load cell 26 are hereinafter described for respective embodiments.

First Embodiment

Figure 2:
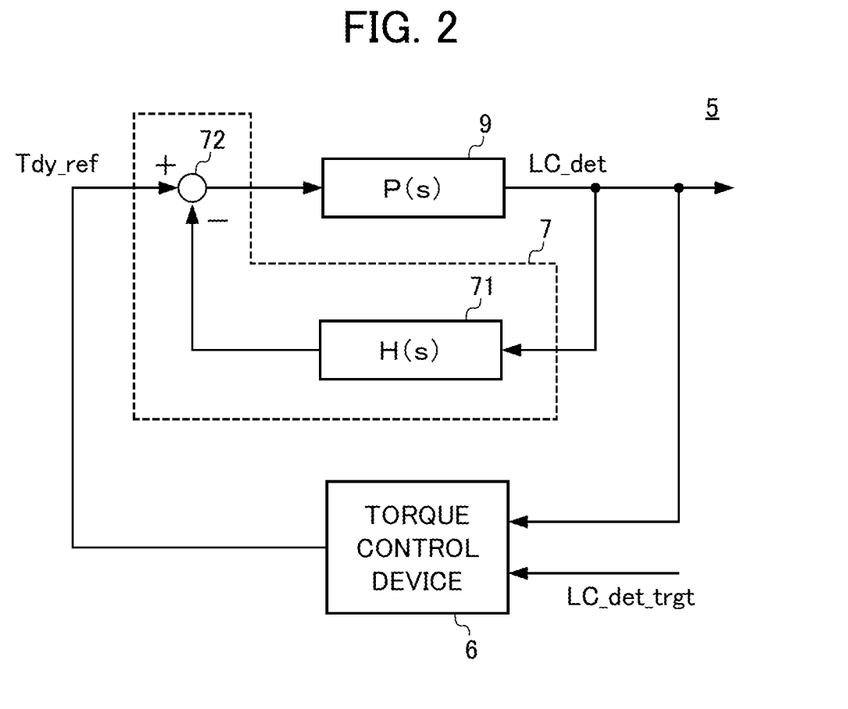
FIG. 2 is a block diagram showing a configuration of a control device of a first embodiment.

FIG. 2 is a block diagram showing a configuration of a control device 5 for a dynamometer system of a first embodiment.

In FIG. 2, a controlled object 9 is configured by including the inverter, the dynamometer, the load cell, etc. described above with reference to FIG. 1. The control device 5 is provided with: a torque control device 6 as a main control device composing a major loop in the control system shown in FIG. 2; and a natural-vibration suppression circuit 7 composing a minor loop in the control system.

The torque control device 6 outputs a torque current command signal Tdy_ref, based on inputs such as an output signal LC_det from the load cell, and a target value LC_det_trgt thereof. The main control device is not limited to a control device for controlling torque, but may be replaced with a control device for controlling position, speed, running resistance, etc., as long as the torque current command signal Tdy_ref is output as a control input signal.

The natural-vibration suppression circuit 7 corrects the torque current command signal Tdy_ref into a control input signal Tdy_ref', and inputs the corrected signal into the controlled object 9, such that the natural vibration of the rocking piece of the dynamometer is suppressed. The natural-vibration suppression circuit 7 is provided with: a differential compensator 71 for performing differential calculation on the output signal LC_det from the load cell; and a subtractor 72 for correcting the torque current command signal Tdy_ref by subtracting the output signal of the differential compensator 71 from the torque current command signal Tdy_ref of the torque control device 6.

Figure 3:
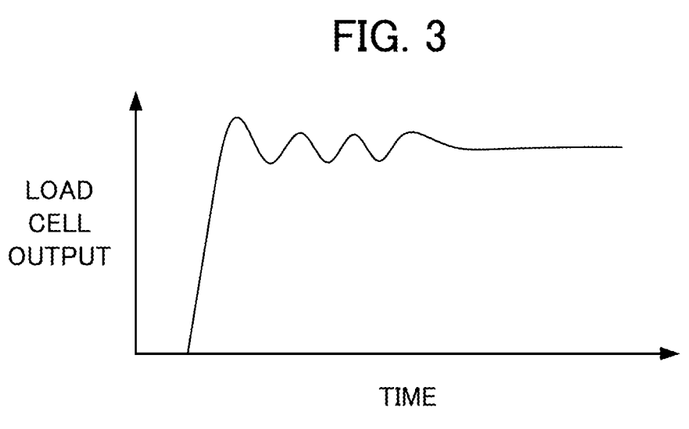
FIG. 3 is a diagram showing an example of stepwise responses by a transfer function, from inputting into an inverter to outputting from a load cell.

FIG. 3 is a diagram showing an example of stepwise responses by a transfer function P(s), from inputting into the inverter to outputting from the load cell. As shown in FIG. 3, an output signal from the load cell exhibits a vibrational behavior due to natural vibration of the rocking piece. Accordingly, the transfer function P(s) is approximated by a secondary delay canonical form as shown in the following Equation (3), by using a natural frequency ωn of the rocking piece and a damping coefficient ζ.

$$P(s) = \frac{LC\_det}{Tdy\_ref'} = \frac{\omega n^2}{s^2 + 2 \cdot \zeta \cdot \omega n \cdot s + \omega n^2} \quad (3)$$

When the transfer function of the differential compensator 71 is H(s), a ratio of an input Tdt_ref to the output LC_det, i.e. a closed loop transfer function G(s), is expressed by the following Equation (4).

$$G(s) = \frac{LC\_det}{Tdy\_ref} = \frac{P(s)}{1 + P(s) \cdot H(s)} = \frac{\omega n^2}{s^2 + 2 \cdot \zeta \cdot \omega n \cdot s + \omega n^2 + H(s) \cdot \omega n^2} \quad (4)$$

At this time, when the transfer function H(s) of the differential compensator 71 is defined by the following Equation (5-1) by using an arbitrary coefficient K (for example, 0<K<1) and a natural vibration frequency ωn, the following Equation (5-2) is derived for the transfer function G(s).

$$H(s) = \frac{2 \cdot K \cdot s}{\omega n} \quad (5-1)$$

$$G(s) = \frac{\omega n^2}{s^2 + 2 \cdot (\zeta + K) \cdot \omega n \cdot s + \omega n^2} = \frac{\omega n^2}{s^2 + 2 \cdot \Delta \zeta \cdot \omega n \cdot s + \omega n^2} \quad (5-2)$$

Figure 4:
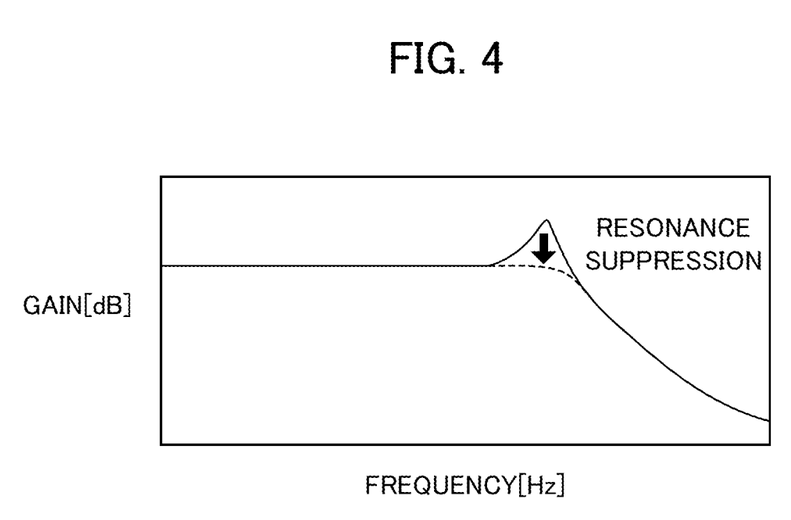
FIG. 4 is a Bode diagram of a closed loop transfer function.

The above Equation (5-2) means that, by providing the differential compensator 71, the controlled object 9 can be provided with damping so as to suppress the natural vibration ωn. Therefore, according to the control device 5 of the present embodiment, by providing the differential compensator 71, and by adjusting the value of the coefficient K thereof to an appropriate value within a range of 0 to 1, the coefficient Δζ of the damping term can be adjusted, and the natural vibration of the rocking piece can be suppressed (see the Bode diagram in FIG. 4).

The transfer function of the differential compensator 71 is not limited to the transfer function H(s) having an exact differential characteristic as defined by the above Equation (5-1). In addition, in order to reduce noise detected in a high frequency band, a transfer function $H_{LPF}(s)$ having a pseudo-differential characteristic defined by the following Equation (6) may be used for the transfer function of the differential compensator 71. In the following Equation (6), a transfer function $1/G_{LPF}(s)$ is an arbitrary function with a relative degree of at least 1.

$$H_{LPF}(s) = \frac{2 \cdot K \cdot s}{\omega n} \cdot \frac{1}{G_{LPF}(s)} \quad (6)$$

Second Embodiment

Figure 5:
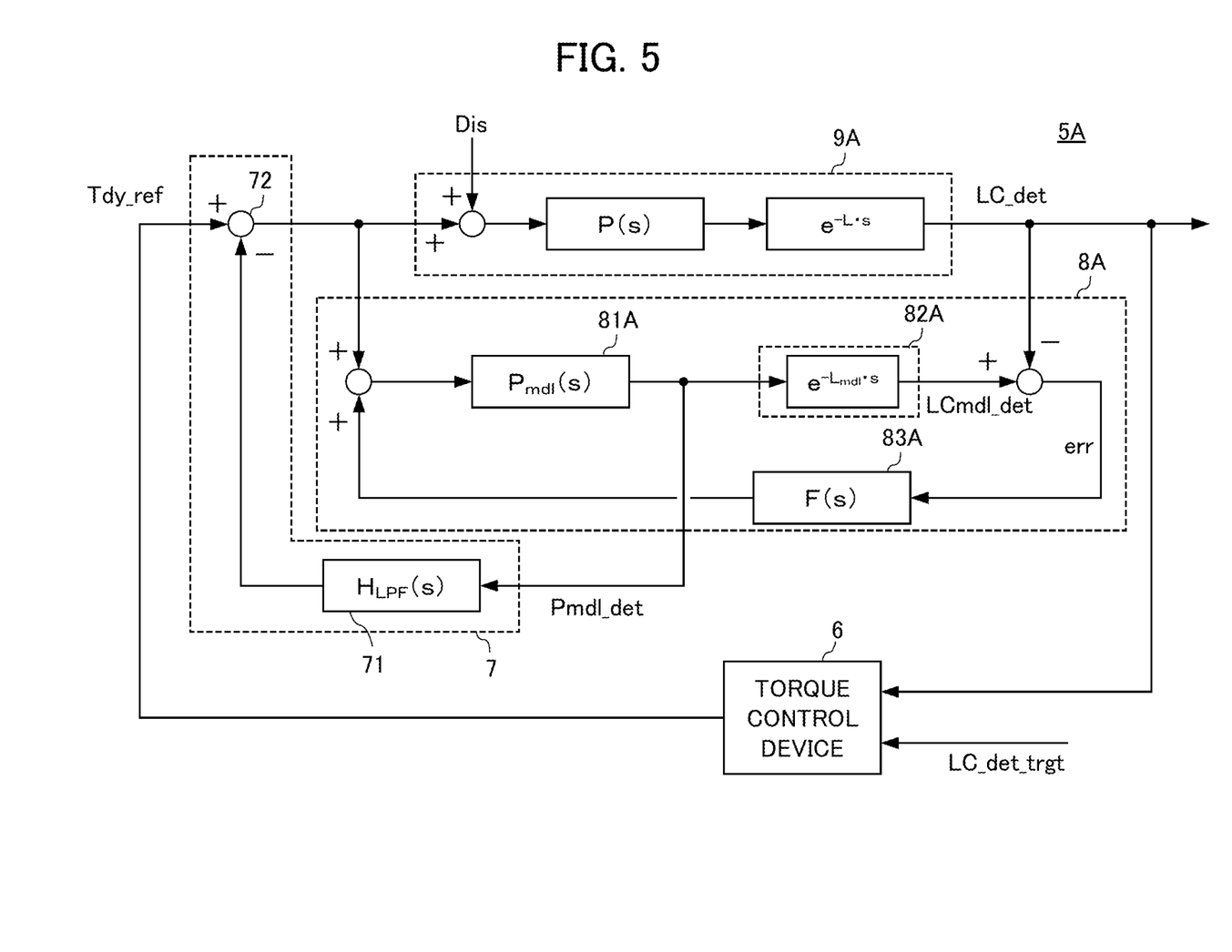
FIG. 5 is a block diagram showing a configuration of a control device of a second embodiment.

FIG. 5 is a block diagram showing a configuration of a control device 5A for a dynamometer of a second embodiment.

The control device 5A of the present embodiment is further provided with an observer calculation unit 8A, which is a point of difference from the control device 5 of the first embodiment. In the following descriptions of the control device 5A, identical reference numerals are assigned to configurations which are identical to those of the control device 5 of the first embodiment, and descriptions thereof are omitted.

The observer calculation unit 8A is provided with a vibration output calculation unit 81A, a delay compensator 82A, and a deviation compensator 83A.

The vibration output calculation unit 81A outputs an approximation signal Pmdl_det, based on an approximation equation shown in the following Equation (7), by using as an input, a sum of the torque current command signal Tdy_ref to be input into the inverter, and a feedback signal (to be described later) to be output from the deviation compensator 83A. The vibration output calculation unit 81A outputs the approximation signal Pmdl_det, which is input into the delay compensator 82A and the differential compensator 71.

$$P_{mdl}(s) = \frac{\omega n^2}{s^2 + 2 \cdot \zeta \cdot \omega n \cdot s + \omega n^2} \quad (7)$$

The delay compensator 82A is provided with a dead-time delay element $e^{-Lmdl \cdot s}$, which delays the approximation signal Pmdl_det by a predetermined dead time Lmdl.

The deviation compensator 83A outputs a feedback signal so as to minimize a deviation err, which is obtained by subtracting the output signal LC_det of the load cell from an output signal LCmdl_det of the delay compensator 82A. The transfer function F(s) of the deviation compensator 83A is expressed by, for example, the following Equation (8), in which a coefficient KG is an adjustment gain (0<KG<1), and $1/F_{LPF}(s)$ is a transfer function with an arbitrary relative degree of at least 1.

$$F(s) = KG \cdot \frac{1}{F_{LPF}(s)} \quad (8)$$

As shown in FIG. 5, the controlled object 9A has a delay corresponding to a dead time L; however, by providing the vibration output calculation unit 81A and the delay compensator 82A as described above, phase lead compensation corresponding to the dead time in relation to a load cell output LC_det is performed on the approximation signal Pmdl_det, which can be input into the differential compensator 71. When disturbance torque Dis is applied to the controlled object 9A by the load, influence of the disturbance is input into the vibration output calculation unit 81A through the deviation err. Therefore, according to the control device 5A of the present embodiment, the natural vibration of the rocking piece can be reliably suppressed, while reducing the influence of disturbance and delay.

Third Embodiment

Figure 6:
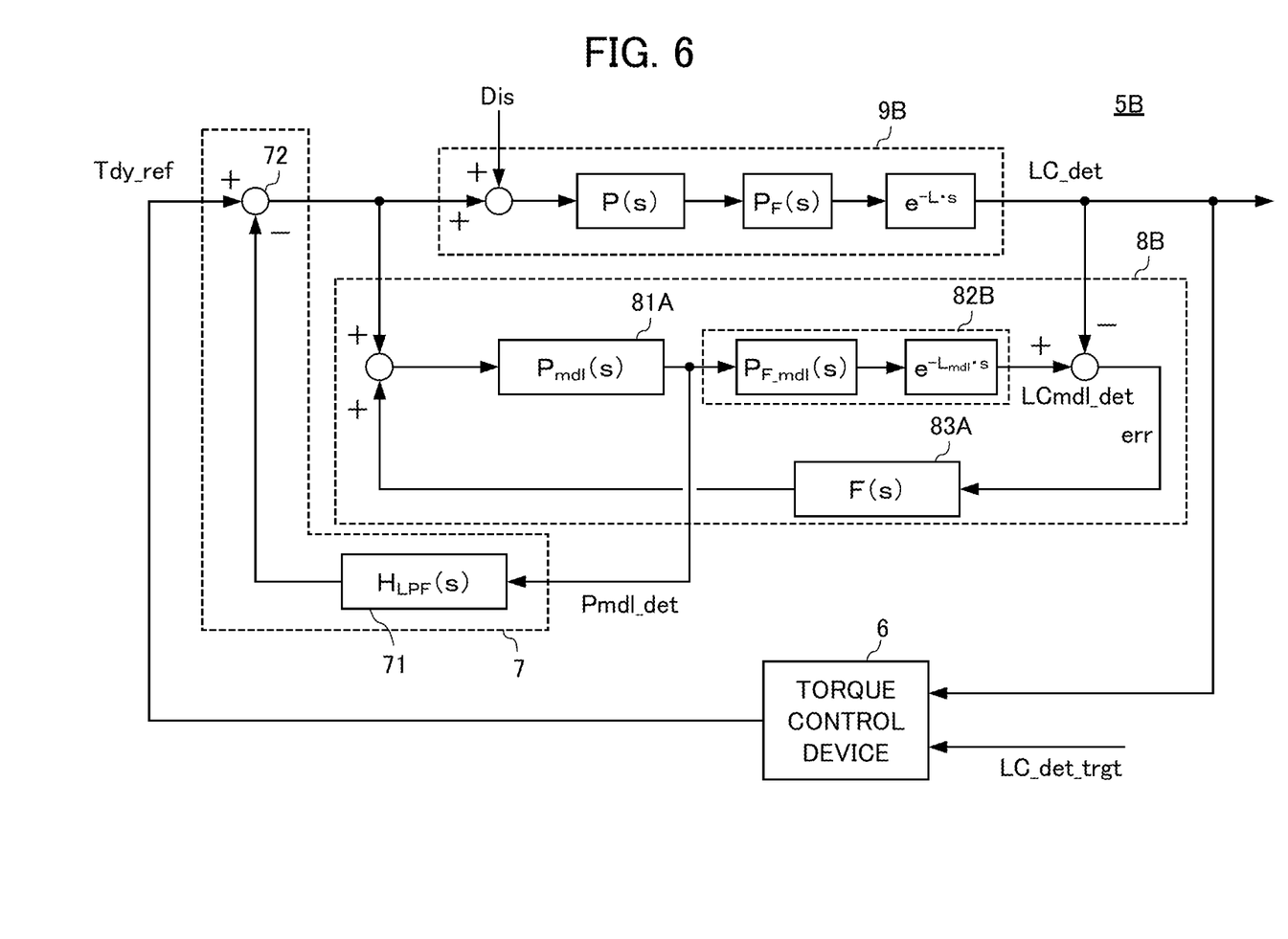
FIG. 6 is a block diagram showing a configuration of a control device of a third embodiment.

FIG. 6 is a block diagram showing a configuration of a control device 5B for a dynamometer system of a third embodiment.

The control device 5B of the present embodiment differs from the control device 5A of the second embodiment, in terms of a configuration of an observer calculation unit 8B. In the following descriptions of the control device 5B, identical reference numerals are assigned to configurations which are identical to those of the control device 5A of the second embodiment, and descriptions thereof are omitted.

The delay compensator 82B of the observer calculation unit 8B is configured by connecting a dead-time delay element $e^{-Lmdl \cdot s}$, which delays the approximation signal Pmdl_det by a predetermined dead time Lmdl, with a lowpass filter element $P_{F\_mdl}(s)$ which removes noise from the approximation signal Pmdl_det.

The controlled object 9B may be provided with a filter $P_F(s)$ for removing noise in a high frequency domain. According to the present embodiment, the delay compensator 82B is configured by connecting the dead-time delay element $e^{-Lmdl \cdot s}$ the lowpass filter element $P_{F\_mdl}(s)$; and as a result, phase lead compensation corresponding to the dead time, and compensation for detection characteristics of the actual load cell including the filter, are performed on the approximation signal Pmdl_det, which can be input into the differential compensator 71. As a result, the natural vibration of the rocking piece can be more reliably suppressed.

Fourth Embodiment

Figure 7:
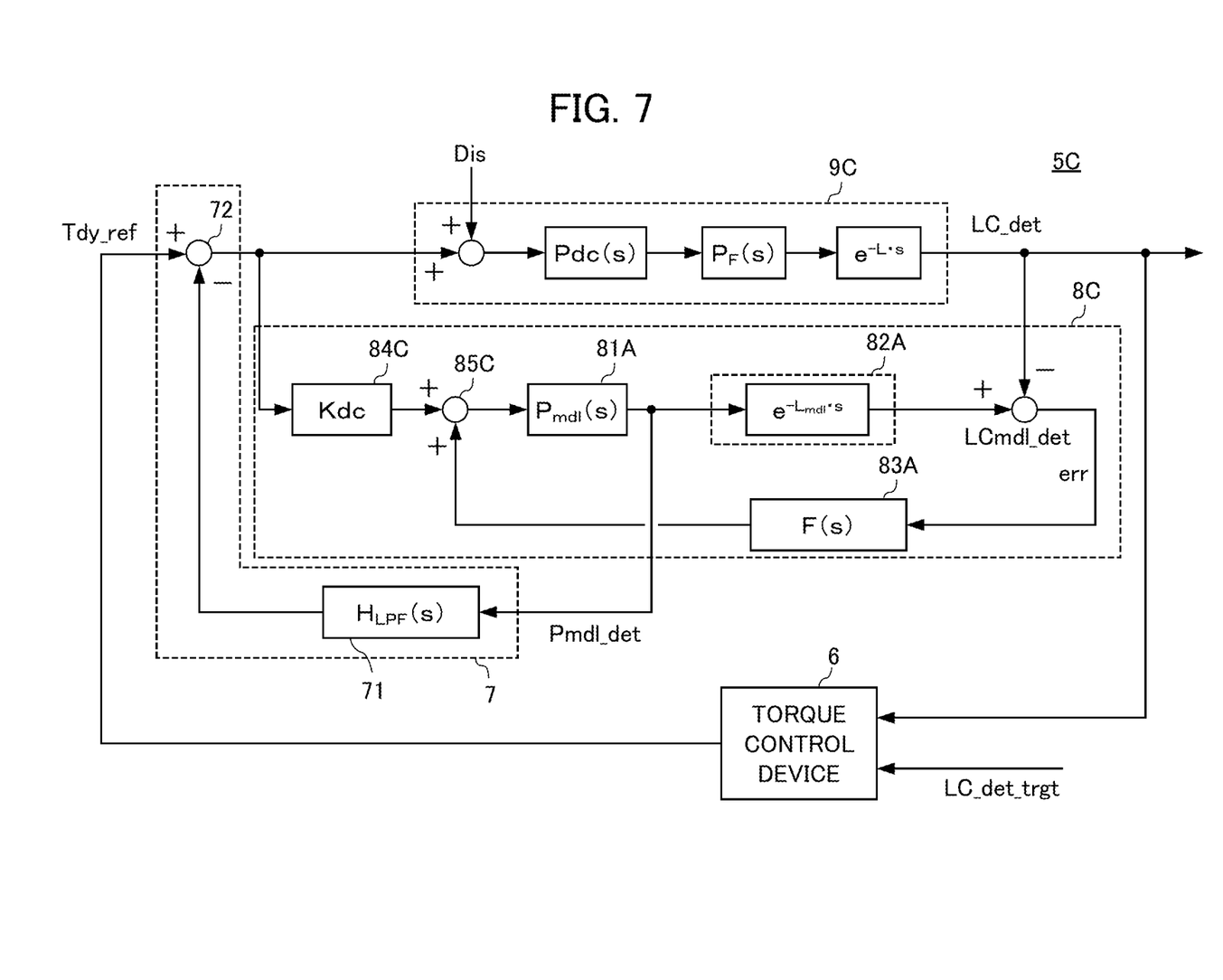
FIG. 7 is a block diagram showing a configuration of a control device of a fourth embodiment.

FIG. 7 is a block diagram showing a configuration of a control device 5C for a dynamometer system of a fourth embodiment.

The control device 5C of the present embodiment differs from the control device 5A of the second embodiment, in terms of a configuration of an observer calculation unit 8C. In the following descriptions of the control device 5C, identical reference numerals are assigned to configurations which are identical to those of the control device 5A of the second embodiment, and descriptions thereof are omitted.

A slight but constant deviation may be generated between a torque current command to be input into the inverter, and torque to be actually generated. Accordingly, in an actual dynamometer system, a direct current gain characteristic may be corrected to eliminate this deviation. In consideration of correction of the direct current gain characteristic, a transfer function Pdc(s) from inputting into the inverter to outputting from the load cell is approximated by the following Equation (9) by introducing a coefficient KC, in place of the above Equation (3).

$$Pdc(s) = \frac{LC\_det}{Tdy\_ref} = \frac{Kdc \cdot \omega n^2}{s^2 + 2 \cdot \zeta \cdot \omega n \cdot s + \omega n^2} \quad (9)$$

The observer calculation unit 8C is further provided with a proportional element 84C, which multiplies a control input signal Tdy_ref by a direct current gain Kdc, in order to compensate for the direct current gain characteristic. An adder 85C calculates a sum of an output signal from the proportional element 84C and a feedback signal from the deviation compensator 83A, and inputs the sum into the vibration output calculation unit 81A.

According to the present embodiment, the control input signal Tdy_ref is multiplied by the direct current gain Kdc, and is input into the vibration output calculation unit 81A; and as a result, dead-time phase lead compensation and direct current gain characteristic compensation are performed on the approximation signal Pmdl_det, which can be input into the differential compensator 71. As a result, the natural vibration of the rocking piece can be more reliably suppressed.

Fifth Embodiment

Figure 8:
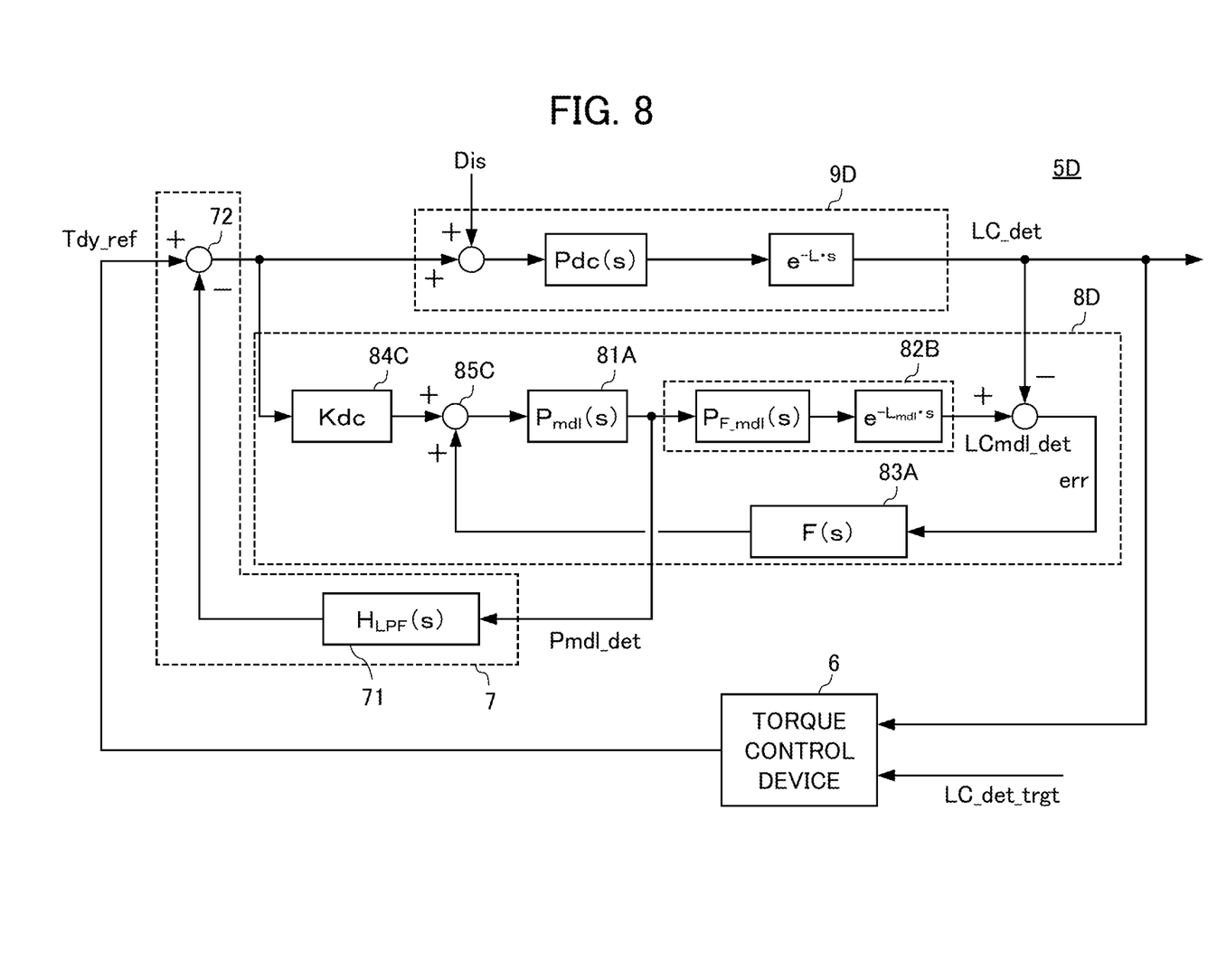
FIG. 8 is a block diagram showing a configuration of a control device of a fifth embodiment.

FIG. 8 is a block diagram showing a configuration of a control device 5D for a dynamometer system of a fifth embodiment.

The control device 5D of the present embodiment differs from the control device 5C of the fourth embodiment, in terms of a configuration of an observer calculation unit 8C. In the following descriptions of the control device 5D, identical reference numerals are assigned to configurations which are identical to those of the control device 5C of the fourth embodiment, and descriptions thereof are omitted.

The delay compensator 82B of the observer calculation unit 8D is configured by connecting a dead-time delay element $e^{-Lmdl \cdot s}$ which delays the approximation signal Pmdl_det by a predetermined dead time Lmdl, with a lowpass filter element $P_{F\_mdl}(s)$ which removes noise from the approximation signal Pmdl_det.

According to the present embodiment, phase lead compensation corresponding to a dead time, detection characteristic compensation of an actual load cell, and direct current gain characteristic compensation are performed on the approximation signal Pmdl_det, which can be input into the differential compensator 71. As a result, the natural vibration of the rocking piece can be more reliably suppressed.

The invention claimed is:

1. A control device for a dynamometer system, comprising:
a dynamometer including a rocking piece, which is connected to a base and a load, the rocking piece being rockingly supported on the base;
an inverter for supplying electric power to the dynamometer; and
a load cell for detecting torque generated in the rocking piece, through a torque arm extending from the rocking piece;
the control device for the dynamometer system further comprising:
a main control device for outputting a main signal, based on an output signal from the load cell; and
a natural-vibration suppression circuit for correcting the main signal so as to suppress a natural vibration of the rocking piece, and for inputting the main signal as a control input signal into the inverter,
wherein the natural-vibration suppression circuit comprises: a differential compensator for performing differential calculation on the output signal from the load cell or an approximation signal of the load cell, which is calculated by using a predetermined approximation equation;
a subtractor for correcting the main signal by subtracting an output signal of the differential compensator from the main signal;
a vibration output calculation unit for outputting the approximation signal, based on an approximation equation for characterizing inputting to the inverter to outputting from the load cell by a predetermined damping coefficient and a natural vibration frequency of the rocking piece, by using as an input, a sum of a control input signal that is input into the inverter or a signal proportional thereto, and a predetermined feedback signal;
a delay compensator including a dead-time delay element for delaying the approximation signal by a predetermined dead time; and
a deviation compensator for outputting the feedback signal to the vibration output calculation unit, so as to minimize a deviation between the output signal from the delay compensator and the output signal from the load cell;
wherein the differential compensator uses, as an input, the approximation signal that is input into the delay compensator.

2. The control device for the dynamometer system according to claim 1,
wherein the delay compensator is configured by connecting the dead-time delay element with the lowpass filter element for removing noise from the approximation signal.

3. The control device for the dynamometer system according to claim 1, further comprising:
a proportional element for multiplying a control input signal, which is input into the inverter, by a predetermined coefficient; and
an adder for inputting a sum of an output signal from the proportional element and the feedback signal, into the vibration output calculation unit.

4. The control device for the dynamometer according to claim 1,
wherein the approximation equation is defined by following transfer function $P_{mdl}(s)$, where $\omega n$ represents a natural vibration frequency of the rocking piece, $\zeta$ represents a damping coefficient, and s represents a Laplace operator; and
wherein the transfer function of the differential compensator is defined by following transfer function $H_{LPF}(s)$ having a pseudo-differential characteristic, where K represents an arbitrary constant that is larger than 0 and smaller than 1, and $1/G_{LPF}(s)$ represents an arbitrary transfer function with a relative degree of at least 1

$$P_{mdl}(s) = \frac{\omega n^2}{s^2 + 2 \cdot \zeta \cdot \omega n \cdot s + \omega n^2} \quad (1\text{-}1)$$

$$H_{LPF}(s) = \frac{2 \cdot K \cdot s}{\omega n} \cdot \frac{1}{G_{LPF}(s)}. \quad (1\text{-}2)$$

5. The control device for the dynamometer system according to claim 2, further comprising:
a proportional element for multiplying a control input signal, which is input into the inverter, by a predetermined coefficient; and
an adder for inputting a sum of an output signal from the proportional element and the feedback signal, into the vibration output calculation unit.

6. The control device for the dynamometer according to claim 2,
wherein the approximation equation is defined by following transfer function $P_{mdl}(s)$, where $\omega n$ represents a natural vibration frequency of the rocking piece, $\zeta$ represents a damping coefficient, and s represents a Laplace operator; and
wherein the transfer function of the differential compensator is defined by following transfer function $H_{LPF}(s)$ having a pseudo-differential characteristic, where K represents an arbitrary constant that is larger than 0 and smaller than 1, and $1/G_{LPF}(s)$ represents an arbitrary transfer function with a relative degree of at least 1

$$P_{mdl}(s) = \frac{\omega n^2}{s^2 + 2 \cdot \zeta \cdot \omega n \cdot s + \omega n^2} \quad (2\text{-}1)$$

$$H_{LPF}(s) = \frac{2 \cdot K \cdot s}{\omega n} \cdot \frac{1}{G_{LPF}(s)}. \quad (2\text{-}2)$$

7. The control device for the dynamometer according to claim 3,
wherein the approximation equation is defined by following transfer function $P_{mdl}(s)$, where ωn represents a natural vibration frequency of the rocking piece, ζ represents a damping coefficient, and s represents a Laplace operator; and
wherein the transfer function of the differential compensator is defined by following transfer function $H_{LPF}(s)$ having a pseudo-differential characteristic, where K represents an arbitrary constant that is larger than 0 and smaller than 1, and $1/G_{LPF}(s)$ represents an arbitrary transfer function with a relative degree of at least 1

$$P_{mdl}(s) = \frac{\omega n^2}{s^2 + 2 \cdot \zeta \cdot \omega n \cdot s + \omega n^2} \quad (3\text{-}1)$$

$$H_{LPF}(s) = \frac{2 \cdot K \cdot s}{\omega n} \cdot \frac{1}{G_{LPF}(s)}. \quad (3\text{-}2)$$

\* \* \* \* \*